United States Patent Office 2,768,665
Patented Oct. 30, 1956

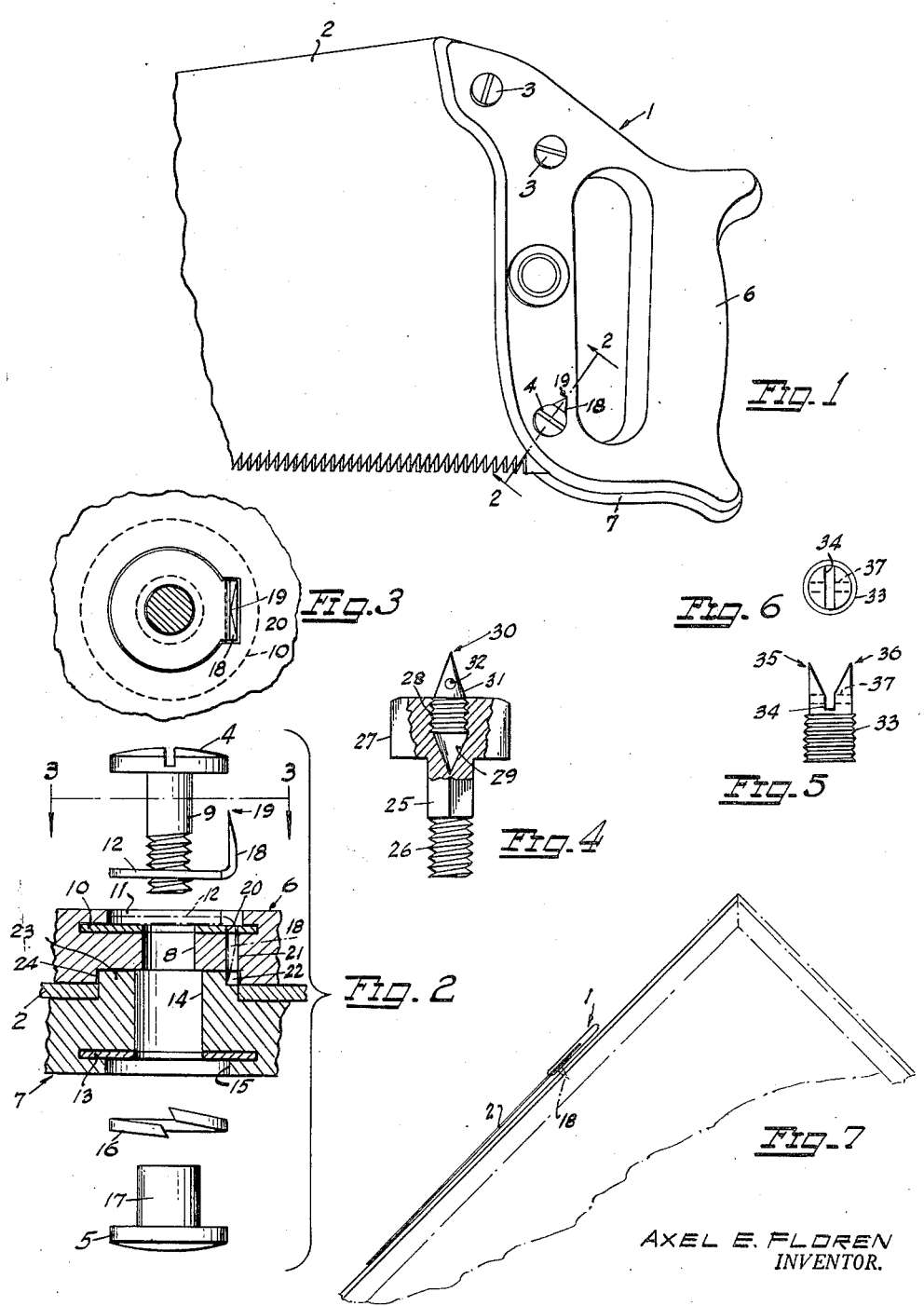

2,768,665

MEANS FOR ATTACHING A TOOL TO AN INCLINED OR VERTICAL SURFACE

Axel E. Floren, Klamath Falls, Oreg.

Application March 21, 1955, Serial No. 495,443

1 Claim. (Cl. 145—35)

This invention relates to attachments for hand tools, such as carpenter saws and the like, and has for one of its principal objects to provide means whereby a workman can temporarily attach a tool to inclined as well as vertical wooden surfaces within convenient reach.

A further object is the provision of an attachment of this character which may be conveniently reversed from an outwardly extending operative position to an inoperative concealed position within the handle or body of the tool.

The foregoing and other objects will appear as the invention is more fully described in the following specification illustrated in the accompanying drawing and finally pointed out in the appended claim.

In the accompanying drawing:

Figure 1 is a fragmentary perspective view of a hand saw showing its handle equipped with my invention.

Figure 2 is an enlarged fragmentary sectional composite view taken approximately along the line 2—2 in Figure 1 and illustrating the component parts of the invention in position to be assembled.

Figure 3 is a sectional top plan view taken along the line 3—3 of Figure 2.

Figure 4 is a sectional detail view of a modified form of the invention.

Figure 5 is a detail view of a further modification.

Figure 6 is a top plan view of Figure 5.

Figure 7 is a view illustrating the manner in which a tool equipped with my invention can be temporarily attached to a gable roof or any other inclined or vertical surface.

Referring now more particularly to the drawing:

In Figure 1 reference numeral 1 indicates generally a saw handle secured to a conventional saw blade 2 by the usual fastening screws 3 and also by a screw and nut 4 and 5 respectively, in accordance with my invention.

The saw handle comprises two sections indicated at 6 and 7 preferably made of molded plastic. The section 6 is molded to form an opening 8 to receive the shank 9 of the screw 4. A washer 10 is molded within the section 6 concentrically with the opening 8 adjacent an annular recess 11 adapted to receive a disc 12 and the head of the screw 4. The other section 7 also has a washer 13 molded within it at the outer end of and concentrically with an opening 14 above an annular recess 15 adapted to receive a lock washer 16 and the head of the nut 5 when its internally threaded skirt portion 17 is disposed within the opening 14 and threadedly engaged with the threaded portion of the screw 9 which along with the other screws and nuts 3 secures the saw blade 2 between both sections 6 and 7 of the handle. An edge of the disc 12 is formed with a right angular projection 18 ground to a sharp point 19 projecting beyond the head of the screw 4 when used for the purposes intended. For storing or concealing the disc 12 and its projection when not in use the disc is removed from the recess 11 and rotated into an inverted position, as shown in broken lines, wherein the projection 18 will extend downwardly through a rectangular opening 20 in the washer 10 through an opening 21 in the handle section 6 and into a cavity 22 formed in a boss 23 on the section 7 and adapted to seat within a matching recess 24 in the section 6.

In the modification shown in Figure 4 I provide a bolt having a shank of square or rectangular shape in cross section for a portion of its length, as at 25, and threaded as at 26 for the remaining portion of its length. The head 27 of the bolt is centrally bored and internally threaded as at 28 and terminates at its bottom end in a conical cavity 29 to receive and conceal the sharply pointed end 30 of an externally threaded plug 31 when the plug is inverted from the position shown in Figure 4 and threadedly engaged with the internal threads 28 of the head of the bolt. The pointed end of the plug is apertured as at 32 to receive a nail or the like for convenience in firmly engaging the plug with the threads of the bolt head. The further modification shown in Figures 5 and 6 comprises a screw shank threaded as at 33 for a portion of its length and divergingly bifurcated at its upper portion from a screw driver slot 34 to terminate in diametrically opposed sharply pointed ends 35—36. An aperture 37 extends through the bifurcations to receive the shank of a nail or the like for advancing or retracting the screw on its threads in the absence of a screw driver for the slot 34. Both modified forms of the invention can be successfully applied to not only the handles of the hand saws but also to power drills, power saws and other portable tools by merely drilling and tapping into their main bodies a hole to receive them to accomplish the objects of the invention.

From the foregoing it will be apparent that a tool provided with any one of the pointed attachments can be quickly and conveniently attached to any inclined or vertical surface of wood or other material into which the pointed element can be pressed or pounded and in some instances forced into the material merely by the weight of the tool to which it is attached.

While I have shown a particular form of embodiment of my invention I am aware that many minor changes therein will readily suggest themselves to others skilled in the art without departing from the spirit and scope of the invention. Having thus described my invention, what I claim as new and desire to protect by Letters Patent is:

An attachment of the class described for a handle made in two sections, both of said sections having aligned openings formed therethrough and enlarged at their outer ends into an enlarged annular cavity, a screw and nut adapted for insertion into said opening and for threaded engagement with each other within the opening, a disc adapted for placement within one of said annular cavities and having a central opening for the passage of said screw therethrough, a projection formed integral with and at right angles to said disc and extending outwardly from said handle, said handle sections having aligned recesses formed therein to receive said projection when the disc is inverted within said annular cavity, and said disc being locked in either of said positions by said screw and nut within said openings through the handle.

References Cited in the file of this patent

UNITED STATES PATENTS

| 939,051 | Matthews | Nov. 2, 1909 |
| 1,675,480 | Bath | July 3, 1928 |
| 2,262,832 | Caldwell | Nov. 18, 1941 |